United States Patent [19]

Petiot

[11] 4,198,914

[45] Apr. 22, 1980

[54] INSTALLATION FOR TREATMENT OF SEDIMENTS COMING FROM STATIONS FOR PURIFICATION OF INDUSTRIAL WASTE WATER

[75] Inventor: Michel Petiot, Cleon, France

[73] Assignee: Regie Nationale des Usines Renault, Boulogne-Billancourt, France

[21] Appl. No.: 913,345

[22] Filed: Jun. 7, 1978

[30] Foreign Application Priority Data

Sep. 6, 1977 [FR] France .............................. 77 17636

[51] Int. Cl.² ................................................ F23G 5/12
[52] U.S. Cl. .................................... 110/238; 110/221
[58] Field of Search ................ 110/238, 221, 222, 266

[56] References Cited

U.S. PATENT DOCUMENTS

| 1,970,109 | 8/1934 | Stratton | 110/266 |
| 2,248,177 | 7/1941 | Karlstrom | 110/238 |
| 2,311,830 | 2/1943 | Hawley | 110/221 |
| 2,891,493 | 6/1959 | Gram, Jr. et al. | 110/266 |
| 2,917,011 | 12/1959 | Korner | 110/266 |
| 3,822,654 | 7/1974 | Ghelfi | 110/238 |

FOREIGN PATENT DOCUMENTS 2014736  4/1970  France .

Primary Examiner—Edward G. Favors
Attorney, Agent, or Firm—Oblon, Fisher, Spivak, McClelland & Maier

[57] ABSTRACT

An installation for the treatment of sediment coming a purification station for industrial waste water. The installation consists of a static furnace incinerator into which sediment is transferred by means of an injector. The injector is made up of an elbow tube connected between the furnace and the sediment, a blast pipe injecting air into the furnace and drawing sediment with it due to the vacuum created by the blasted air flow, and an additional air inlet in the furnace wall, the additional air inlet surrounding the elbow.

5 Claims, 1 Drawing Figure

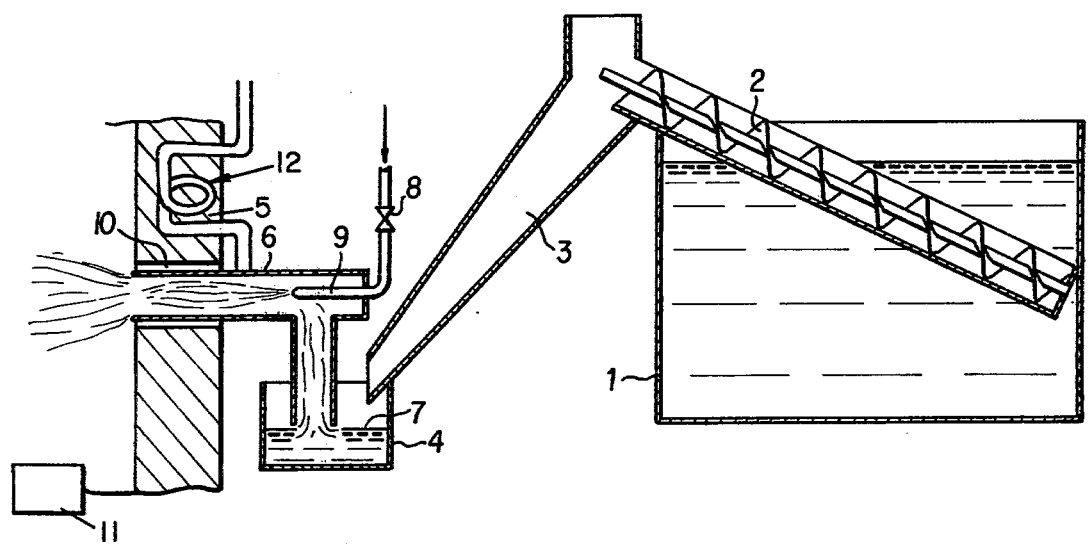

4,198,914

INSTALLATION FOR TREATMENT OF SEDIMENTS COMING FROM STATIONS FOR PURIFICATION OF INDUSTRIAL WASTE WATER

BACKGROUND OF THE INVENTION

1. Field of the Invention

The present invention relates to an installation for treatment of sediments coming from stations for purification of industrial waste water. A station for pretreatment of industrial waste water has already been the object of French Pat. No. 73/27690, filed in the name of the present applicant and the Peugeot Automobile Co. on July 27, 1973.

2. Description of the Prior Art

According to that patent, the waste water, containing up to 10% of products not able to be released into the environment, are treated in an installation permitting an accelerated separation, in three phases, of the incoming water subjected to localized heating operation.

The said incoming waters contain a large quantity of oil, notably cutting liquids, drippings from treated parts and metal shavings. This constitutes the ligher phase which is recovered at the surface of the installation.

Other impurities are found in the heavier phase and recovered at the bottom of the installation in the form of sediments made up of fine particles, minerals from grinding wheel wear or various objects such as wads of plastic, shreds of cardboard or wood, etc. . . .

The middle phase, relatively homogeneous in the pretreatment installation, next undergoes complementary operations such as flocculation, centrifuging, from which results a new heavy phase charged with residues to be eliminated, and a light phase which can be returned to the environment.

The oily phase, recovered at the start of the operation, can be for the most part regenerated and recycled.

SUMMARY OF THE INVENTION

The installation which is the object of the present invention is intended for the treatment of the heaviest phase coming from pretreatment, as well as that obtained from the middle phase, after flocculation, centrifuging, etc. . . .

The preceding residues generally represent a relatively large volume, since it is of the order of several cubic meters per day for a total daily treatment of some thousands of cubic meters of water. These have for a long time been emptied into authorized dumping grounds, but stricter regulations have led to the search for other solutions.

The combustion of this detritus proves to be a satisfactory solution, since the treatment of 4 m³ of the latter leads to only about 10 kg of residual ash.

However, in putting such a process into operation one runs into the problem of transshipment of heterogeneous residues between the storage tank and the incinerator. Thus, pumps will not be found adequate except for relatively homogeneous sediments without granular solids larger than 5 mm; in addition, they have only a limited lifetime due to wear. The said residues consequently cannot be burned and the problem of their elimination is not solved.

The present invention remedies the above drawbacks, notably in eliminating the operations of mechanical pumping and filtration, difficult and complex. It will be described with reference to the attached FIG. 1

BRIEF DESCRIPTION OF THE DRAWINGS

Other objects and many of the attendant advantages of the present invention will be readily appreciated as the same becomes better understood by reference to the following detailed description when considered in connection with the accompanying drawing wherein:

The sole FIGURE shows a schematic representation of the invention.

The sediments to be treated are stored in a tank 1 from which they are extracted by any adequate means, such as an Archimedes screw 2 for example, which discharges them via a spout 3 into an auxiliary tank 4.

A static furnace 5 with one or more oil burners 11 which may operate intermittently so as to maintain an internal temperature between 800° C. and 1200° C. permits pyrolysis of the incoming material.

An injector 6, constituted by an elbow tube one end of which is at the surface 7 of the sediment to be incinerated situated in the auxiliary tank 4 and the other opens into the interior of the furnace 5, permits the introduction of the sediment into the hot furnace.

This operation is accomplished with compressed air at about 6 atmospheres delivered from a source, not shown, controlled by the valve 8, to the interior of the horizontal part of the injector 6 via a blast pipe 9 inserted in an airtight manner through the injector wall.

The caliber of the injector is adapted to the requirements and readily permits the passage of particles 12 mm across coming from tank 4 under the action of the aspirator type vacuum created by the expansion of the air under pressure from the pipe 9 into the injector 6.

The air necessary for the pyrolysis of the incoming material is provided mainly by the passage 10 left free between the injector 6 and the furnace wall, in addition to the air injected by the pipe 9 and certain complementary inputs which may be preheated by the recovery of some of the heat furnished by the combustion of the detritus, e.g. by passage through coils 12 located in the furnace or its walls.

The ashes or slag are removed at the bottom of the furnace while the water vapor and different fumes are eliminated at the top.

As an example, an injector conforming to the preceding description would be composed of two arms some thirty centimeters long and 2 to 3 cm in diameter.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Installation for treatment of sediments coming from purification stations for industrial waste water of the type with incineration in a static furnace, comprising:

injector means for transferring sediments into the incinerating furnace which comprises an elbow tube, one end of which opens into the surface of the sediments to be incinerated and the other opens into the interior of the furnace; and a blast pipe admitting air under pressure and passing in an airtight manner through a wall of the injector means disposed in a horizontal arm of the latter so as to deliver air under pressure in the direction of the furnace, thus creating a vacuum in the injector which permits aspiration of the sediments.

2. Installation for treatment of sediments coming from purification stations for industrial waste water, of the type with incineration in a static furnace, comprising:

injector means for transferring sediments into the incinerating furnace which comprises an elbow tube, one end of which opens into the surface of the sediments to be incinerated and the other opens into the interior of the furnace;

a blast pipe admitting air under pressure and passing in an airtight manner through a wall of the injector means disposed in a horizontal arm of the latter so as to deliver air under pressure in the direction of the furnace, thus creating a vacuum in the injector which permits aspiration of the sediments; and means for providing a complementary input of air which comprises a passage open to atmosphere formed between the periphery of the injector and a wall of the furnace.

3. Installation as set forth in claim 1 further comprising means for operating the furnace intermittently so as to maintain its internal temperature between 800° C. and 1200° C.

4. Installation as set forth in claim 1, further comprising means for adjusting the flow of input air to pyrolyze the sediments.

5. Installation as set forth in claim 2, wherein said means for providing a complementary input of air further comprises a second intake for external air preheated by means of heat recovered from the furnace.

* * * * *